W. WENSLEY.
METHOD OF MAKING SOLID MAST BANDS.
APPLICATION FILED SEPT. 15, 1909.
979,403.
Patented Dec. 20, 1910.
2 SHEETS—SHEET 1.
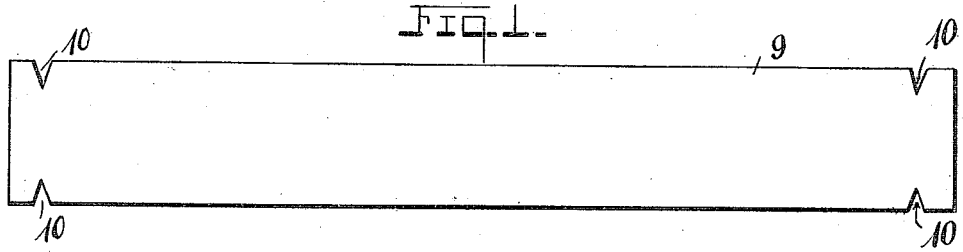
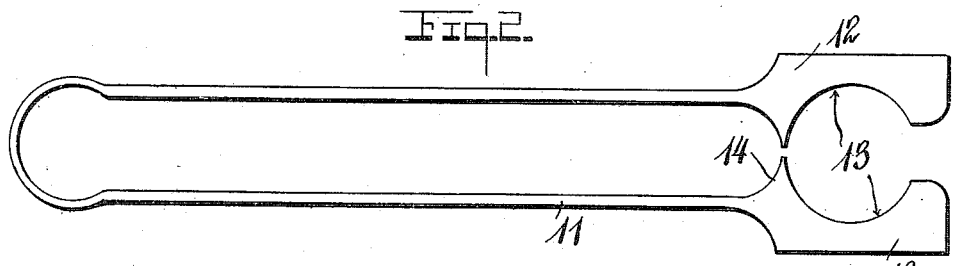
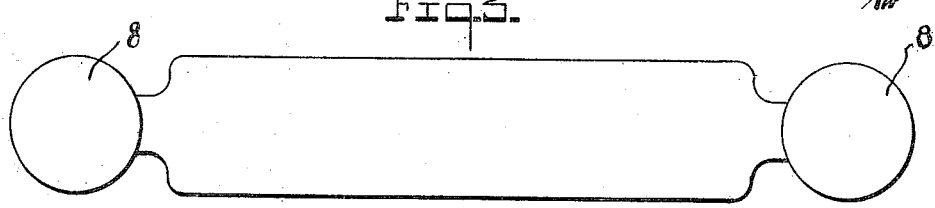
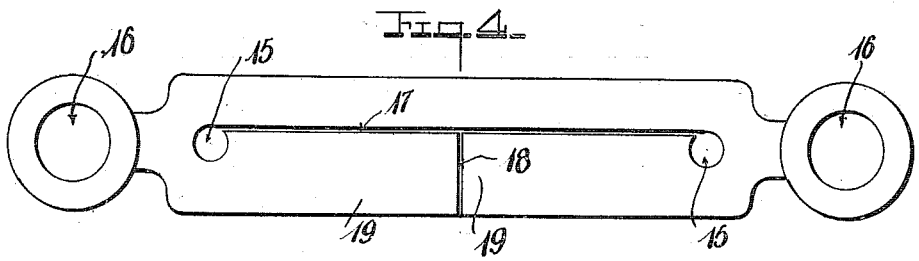
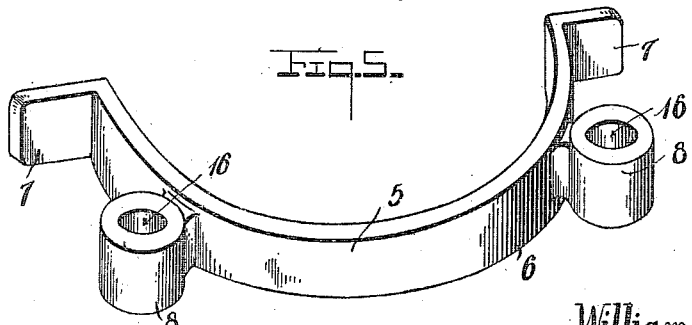
Witnesses
Ernest Crocker
Inventor
William Wensley.
By Chandler & Chandler
Attorneys
THE NORRIS PETERS CO., WASHINGTON, D. C.

W. WENSLEY.
METHOD OF MAKING SOLID MAST BANDS.
APPLICATION FILED SEPT. 15, 1909.
979,403.
Patented Dec. 20, 1910.
2 SHEETS—SHEET 2.
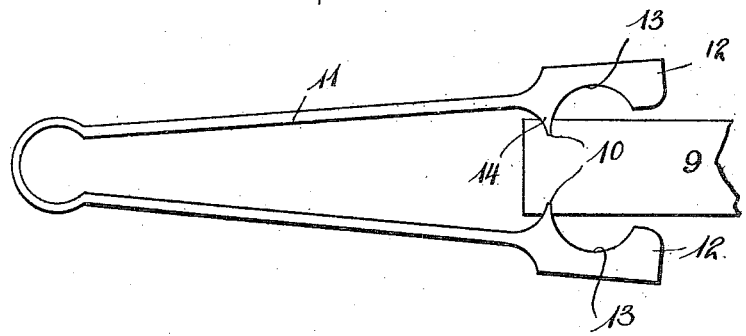
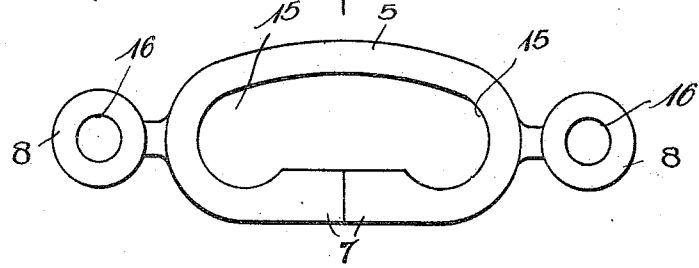
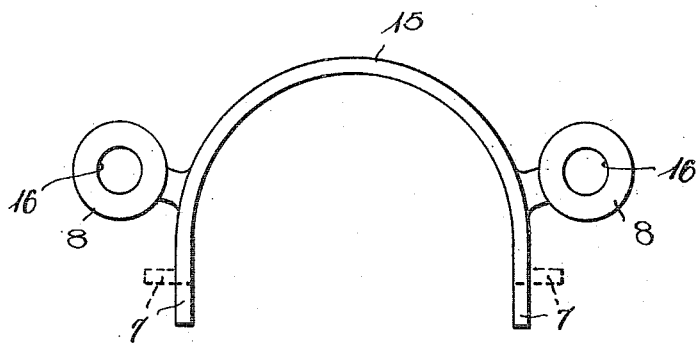
Witnesses
Ernest Crocker
Inventor
William Wensley.
By
Attorneys

UNITED STATES PATENT OFFICE.

WILLIAM WENSLEY, OF SEATTLE, WASHINGTON.

METHOD OF MAKING SOLID MAST-BANDS.

979,403.  Specification of Letters Patent.  Patented Dec. 20, 1910.

Application filed September 15, 1909. Serial No. 517,891.

*To all whom it may concern:*

Be it known that I, WILLIAM WENSLEY, a citizen of the United States, residing at Seattle, in the county of King, State of Washington, have invented certain new and useful Improvements in Methods of Making Solid Mast-Bands; and I do hereby declare the following to be a full, clear, and exact description of the invention, such as will enable others skilled in the art to which it appertains to make and use the same.

The invention relates to a method of making solid mast bands.

The primary object of the herein described method is to simplify the manufacture and to increase the strength of a solid metallic mast band and to obviate the welding of the lugs forming the eyes in said band thereby minimizing the cost of production of the article.

With this and other objects in view the herein described method is carried out by the steps and in the manner as will be hereinafter described in detail and as illustrated in the accompanying drawings, while the novelty of the invention will be pointed out in the claims hereunto appended.

In the drawings:—Figure 1 is a plan view of a steel bar with hack cuts near opposite ends thereof, showing the first step in the method. Fig. 2 is a plan view of tool for forming the lugs at opposite ends of the steel bar and used in the second step of the method. Fig. 3 is a plan view of the bar after having been acted upon by the tool. Fig. 4 is a plan view of the bar prior to the shaping thereof for completing the article. Fig. 5 is a perspective view of the article when completed. Fig. 6 is a fragmentary top plan view of a blank with the tool in position for forming an eye at the end of said blank. Fig. 7 is a top plan view of the article prior to its being bent into semi-circular shape. Fig. 8 is a side elevation of the article when bent into semi-circular shape and prior to the formation of the ear terminals, the ear terminals being shown bent by dotted lines into the position as illustrated in Fig. 5 in the drawing when the article has been completed.

Similar reference characters indicate corresponding parts throughout the several views in the drawings.

In the drawings the numeral 5 designates a solid mast band constructed of a single piece of material preferably steel having a semi-annular portion 6 terminating in oppositely directed lugs 7, arranged in alinement with each other. Formed on the semi-annular portion 6 a distance removed from the lugs 7 are eyes 8, which latter project outwardly radially from the semi-annular portion.

The mode of making the article consists in taking a bar 9 of steel of suitable dimensions and heating the ends for several inches to the proper degree then niching the same as at 10, at opposite sides thereof near its ends by means of a suitable hack cutter and this being the first step in the method. A tool 11 is employed in the second step of the method comprising a U-shaped spring handle having at its terminals, formers, each being in the form of a block 12, the inner face of which is concaved to provide a semi-circular recess 13, so that when the blocks 12 are brought together the recesses will coöperate with each other making a substantially complete circle. This tool 11 is applied to one end of the bar 9, and then to the other in a like manner so as to have the cutting points 14, engage the niches 10, in said bar and then the tool and bar are placed on an anvil and struck one or more blows by a hand or drop hammer which aids in the distribution of the metal in the bar. This second step of the method shapes the ends of the bar 9, to form the eyes 8, substantially as shown in Fig. 3. The bar is again reheated and holes 15 and 16 are punched through the same in any suitable manner. And this might be termed the third step of the method. In the fourth step of the method a hack cutter of the desired length is brought into action upon the bar, so as to cut the same to form a slit 17, between the holes 15, and thereafter any suitable wedge is inserted in the latter to enable the bar to be cut into on one side as at 18. I then thrust the bifurcated part of the bar 9, upon the horn of an anvil and with the necessary number of blows shape the same by a common hand hammer so that the bifurcated ends 19 will be spread apart, and in this final operation the article is completed in form and outline as shown in Fig. 5.

It is obvious that from the foregoing method it obviates the necessity of welding the eyes 8, to the semi-annular portion 6, so that the finished article thus produced is one homogeneous piece of metal.

What is claimed is:—

1. The herein described method of making solid mast bands consists in the following steps, namely, forming niches near opposite ends of a bar of steel of suitable dimension, then engaging niches in the bar by a tool to form rounded terminals, then punching holes in said terminals and also at a distance removed therefrom, then slitting the bar between the innermost holes, then cutting into the bar from one side thereof to said slit, and finally shaping the bar into semi-annular contour.

2. The herein described method of making solid mast bands consists in niching opposite sides of the bar near its ends, engaging said niches by a suitable tool to displace the material of the bar for forming rounded terminals, then punching holes in said terminals and at points between the same, then slitting the bar longitudinally between the innermost hole, then cutting into the bar from one side to the longitudinal slit therein and finally shaping the bar, substantially as described.

In testimony whereof, I affix my signature, in presence of two witnesses.

WILLIAM WENSLEY.

Witnesses:
  E. J. CLARK,
  G. H. TWEEDIE.